United States Patent [19]

Mielenz et al.

[11] 3,968,363

[45] July 6, 1976

[54] RADIATION FLUX AVERAGING DEVICE OF HIGH EFFICIENCY

[75] Inventors: Klaus D. Mielenz, Kensington; Radu Mavrodineanu, Rockville; Edwin D. Cehelnik, Gaithersburg, all of Md.

[73] Assignee: The United States of America as represented by the Secretary of Commerce, Washington, D.C.

[22] Filed: Feb. 4, 1975

[21] Appl. No.: 547,075

[52] U.S. Cl. .......................... 250/228; 250/211 R; 313/101
[51] Int. Cl.² .......................................... G01J 1/00
[58] Field of Search ............... 250/228, 211 R, 216; 313/93, 101

[56] References Cited
UNITED STATES PATENTS

| | | | |
|---|---|---|---|
| 1,897,219 | 2/1933 | Schröter | 250/228 |
| 2,208,147 | 7/1940 | Eisler | 250/228 |
| 2,984,747 | 5/1961 | Walker | 250/228 |
| 3,087,069 | 4/1963 | Moncrieff-Yeates | 250/211 |

Primary Examiner—David C. Nelms
Attorney, Agent, or Firm—David Robbins; Eugene J. Pawlikowski; Alvin Englert

[57] ABSTRACT

A flux averaging sphere having an improved efficiency and a high averaging and diffusing effectiveness over the visible and ultraviolet ranges. The interior surface of the sphere is coated with a white diffusing material which has a higher reflectance for visible radiation than for ultraviolet radiation. A radiation converting means is disposed inside the sphere for converting incoming ultraviolet radiation to visible radiation before reflections from the sphere wall occur. The radiation converting means is transparent to incoming visible radiation which therefore remains unaffected. The efficiency of the device is further improved by eliminating the small gap between the output area of the sphere and the face of the photomultiplier tube. The sphere is formed with a tapered tubular extension at the output area and the face of the photomultiplier tube is abutted against the end of the extension thereby forming a substantially light tight seal.

6 Claims, 3 Drawing Figures

RADIATION FLUX AVERAGING DEVICE OF HIGH EFFICIENCY

THE INVENTION

The present invention relates to an improved averaging device for photometric measurements.

In the performance of photometric measurements it is extremely important to attain an accurate, consistent and reproducible photodetector response and this should be true even when the samples being measured are changed. Since changing samples may cause the position, angle or polarization of the beam incident on the detector to change and since the photodetector response may vary with beam position, angle or polarization an averaging device is frequently disposed between the sample and the photodetector. The function of this device is to average the radiation flux from the sample and to ensure that a uniform, averaged flux is incident on the face of the photodetector, regardless of the position or angle of the incoming flux.

A problem with prior art flux averaging devices has been their relative inefficiency. If the loss in efficiency becomes unduly large, then the photometric accuracy gained by averaging is offset by a loss in precision due to reduced signal to noise ratios. This difficulty has been most pronounced in the ultraviolet region of the spectrum where averaging devices of the prior art have been least efficient.

It is thus an object of the present invention to provide a radiant flux averaging device having both an improved efficiency and a high averaging and diffusing effectiveness in the spectral range of interest.

It is a further object of the device to provide a radiant flux averaging device which is more efficient than prior art averaging devices in the ultraviolet region.

It is still a further object of the invention to provide an improved radiant flux averaging device which is useful for making accurate photometric, radiometric, spectrophotometric and spectrofluorimetric measurements.

The above objects are attained by providing an averaging sphere having a diffusely reflecting interior surface which has a higher diffuse reflectance over the visible portion of the spectrum than over the ultraviolet portion. A radiation converting means is provided in the sphere for efficiently converting incoming ultraviolet radiation to visible radiation before the radiation is reflected from the interior surface of the sphere. In one embodiment the radiation converting means comprises a cuvette containing a solution of 2,5-diphenyloxazole in n-hexane which has a white reflective backing and which is disposed near the center of the sphere.

Additionally, it has been found that the efficiency of the device in both the visible and ultraviolet portions of the spectrum is improved substantially by eliminating the small space between the face of the photodetector and the output area of the averaging sphere which has been present in devices of the prior art. According to the present invention a tapered tubular extension is formed at the output area of the sphere and the face of the photodetector is abutted against the end of the extension thus forming a relatively light tight seal which prevents the escape of radiant flux.

The invention will be better understood by referring to the accompanying drawings in which.

Figure 1:
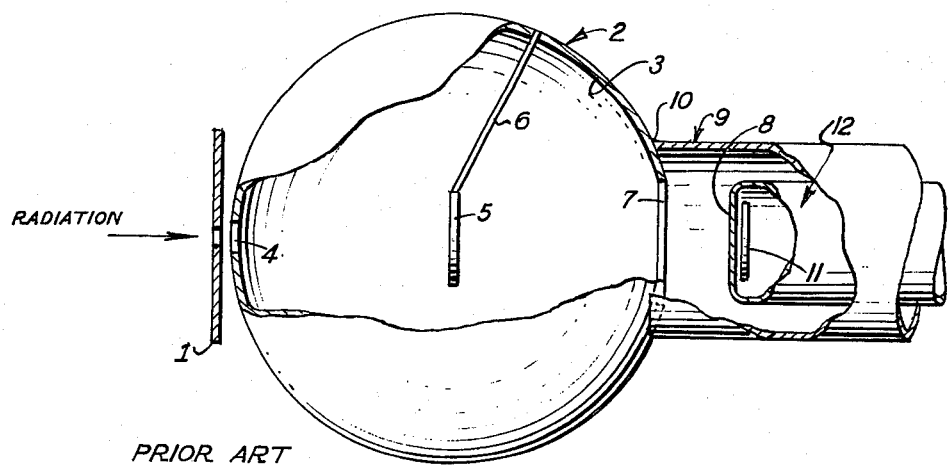
FIG. 1 is a view of an averaging sphere arrangement according to the prior art.

FIG. 1 shows an averaging sphere arrangement according to the prior art. Radiation flux is incident through shutter 1 and input opening 4 on target 5 of sphere 2, is averaged within the sphere and ultimately is reflected out of the sphere through output area 7 onto face 8 of photodetector 12. While photodetector 12 is a photomultiplier tube in the usual case, other types of photodetectors may be utilized.

The averaging sphere 2 may be metallic and is coated on its interior surface 3 with a white diffusing material such as barium sulfate or magnesium oxide or any similar material having a high diffuse reflectance in the spectral interval of interest, for diffusely reflecting the light incident thereon. Additionally, the sphere shown in FIG. 1 has a circular disc-like target 5 disposed at the center thereof. The target is also coated with the white diffusing material and its purpose is to insure that the radiation flux undergoes at least two reflections before being incident on photodetector 12. The target 5 is supported in the sphere by metallic rod 6 which is secured to the sphere wall by a bolt, by soldering or welding, or by other conventional support means. Further, target 5 may be supported by other mechanical support means than rod 6.

Photomultiplier tube 12 having photocathode 11 is supported in conventional photomultiplier housing 9 which comprises a cylindrical tube. The housing and photomultiplier are positioned so that the end of the housing abuts the sphere at 10 thereby disposing photomultiplier tube 12 a short distance away from output area 7 of the sphere. In a specific prior art arrangement according to FIG. 1 the distance between tube 12 and output area 7 was measured to be 16 mm.

According to the operation of the averaging sphere arrangement shown in FIG. 1, light enters input opening 4, is reflected from target 5, undergoes a reflection or multiple reflections at the interior surface of the sphere, and finally is reflected out through output area 7 onto the face of the photomultiplier tube 12. While the barium sulfate or magnesium oxide coating on the interior spherical surface 3 is a highly efficient reflector for visible light, it is somewhat less efficient and has a somewhat lower reflectance for light in the ultraviolet region of the spectrum. Therefore if the input radiation flux included components both in the visible and the ultraviolet portions of the spectrum the averaging sphere will be less efficient for the incoming radiation in the ultraviolet range and the overall efficiency of the sphere will be adversely affected.

Figure 2:
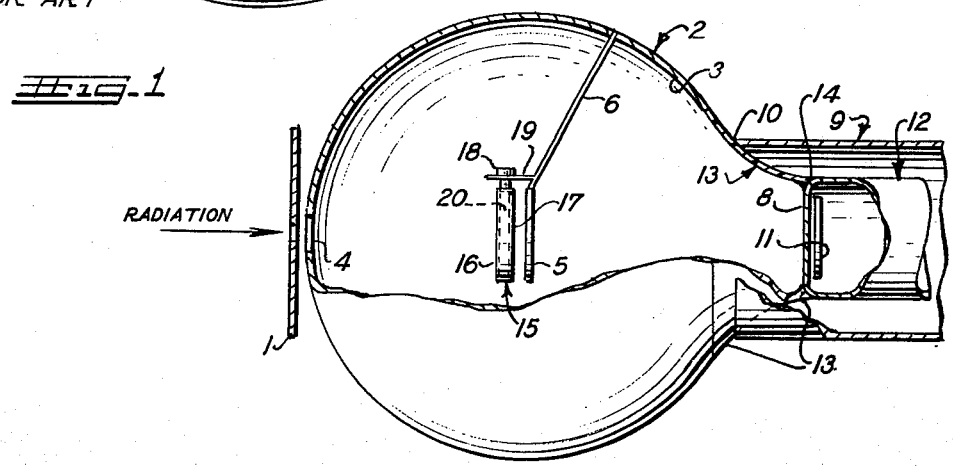
FIG. 2 is a view of the improved averaging sphere arrangement of the invention.

The improved averaging sphere of the invention is shown in FIG. 2 wherein parts identical to those in FIG. 1 have been designated with the same reference numerals. To improve efficiency a means is provided in the sphere of FIG. 2 to convert radiation in the ultraviolet portion of the spectrum to visible radiation before the radiation is reflected from the target 5 or interior surface. In a preferred embodiment of the invention the means for converting the ultraviolet radiation to visible radiation comprises a cylindrical quartz cuvette 15 having plane parallel circular faces 16 and 17, which is disposed near the center of the sphere. The cuvette is filled with a fluorescent material such as a fluorescent liquid which in the ideal case is capable of absorbing all of the incident flux at the shorter ultraviolet wavelengths and converting it into longer wavelength visible radiation with a quantum efficiency of nearly unity, and also is transparent to visible radiation which should pass through the material unaffected and be reflected by the white target.

A solution of 2,5-diphenyloxazole (PPO) in n-hexane at a concentration of .923 g/l was found to approximate these characteristics and is suitable for use as the radiation converting medium. Instead of n-hexane the solvent cyclohexane may be used and instead of the dye PPO, 1,6-diphenyl-1,3,5-hexatriene (DPH) may be used.

In the embodiment shown in FIG. 2 the cuvette is utilized with a separate target 5 in which case the windows 16 and 17 have the same dimension as the target. In the alternative separate target 5 may be omitted and the rear window of the cuvette, 17, may be coated with a reflective coating such as of barium sulfate or magnesium oxide material so that it becomes the reflecting target.

In the operation of the device, radiation flux in the ultraviolet range enters through input opening 4 and is incident upon cuvette 15 which converts the short wavelength radiation into longer wavelength radiation in the visible range which radiation is emitted from cuvette 15 in all directions. In the case where a separate target 5 is used the radiation emitted from back window 17 is reflected from the target 5 and may be transmitted back through the cuvette 15 which is transparent to visible radiation to surface 3 of the sphere where it is again reflected. Visible radiation entering the sphere through input opening 4 passes directly through cuvette 15 to target 5 so that for visible radiation the target 5 sees the same as what it sees in the embodiment of FIG. 1. Where a separate target is used cuvette 15 has mechanical projection 18 projecting therefrom and may be attached to rod 6 by rod 19 which is secured to projection 18 and rod 6 by conventional mechanical means known to thosed skilled in the art such as soldering, welding, etc.

In the case where the target is disposed directly on face 17 of cuvette 15, again incoming ultraviolet radiation is converted to visible radiation by cuvette 15 and is emitted from the cuvette in all directions. Part of the visible radiation emitted is reflected from the reflecting surface of face 17 back through cuvette 15 which is transparent to the visible radiation. Visible radiation entering the sphere from the outside passes through cuvette 15 which is transparent thereto and is reflected from the reflecting surface of face 17. Where there is no separate target, cuvette 15 may be supported in the sphere by conventional mechanical means known to those skilled in the art such as a rod similar to rod 6 which would be attached to projection 18.

While the embodiment of FIG. 2 has been described in conjunction with a sphere having an internal target the invention is not limited thereto and may be utilized with spheres not having targets. With such spheres the output area and photodetector would be disposed at a position other than 180° from the input opening of the sphere. The fluorescent radiation converting material would be disposed at or near the interior surface of the sphere directly opposite the input opening so that the fluorescent material would be the first thing in the cavity struck by incoming radiation flux for maximum efficiency. A variety of specific arrangements may be employed, such as for instance providing a fluorescent coating on the interior surface of the sphere at an area opposite the input opening or locating a hemispherical cuvette containing fluorescent material at this area with the round part of the cuvette in abutment with the interior surface of the sphere and the plane surface of the hemisphere facing the input opening.

According to a further aspect of the invention the efficiency of the averaging sphere is improved in both the visible and ultraviolet portions of the spectrum. In an analysis of an averaging sphere of the prior art such as is shown in FIG. 1, it was found that poor efficiency to a significant extent was due to inadequate coupling of the exit port and the detector. As noted above, in one specific arrangement of the prior art according to FIG. 1, with photomultiplier housing 9 meeting sphere 3 at 10 the distance between the output area 7 and the face of the photomultiplier 8 was as small as 16 mm. However, even with this small gap it was found that a large amount of the diffuse flux from the sphere was lost between the output area and the detector and was responsible for decreasing the efficiency of the device. In the embodiment shown in FIG. 2, the sphere is formed with a tapered tubular extension 13 at the output area making the cross section of the enclosure substantially pear-shaped. Now with the photodetector housing 9 in contact with the enclosure exterior at 10 the face 8 of the photomultiplier tube 12 is in abutment with the end of the extension 13 forming a substantially light tight seal 14 which is effective to prevent the loss of radiation. To prevent electrical problems from arising due to the close proximity of the sphere wall and the photocathode, extension 13 was made of bakelite. It was found, as will be discussed in conjunction with FIG. 3, that this improvement significantly increased the efficiency of the averaging sphere over both the visible and the ultraviolet portions of the spectrum.

Figure 3:
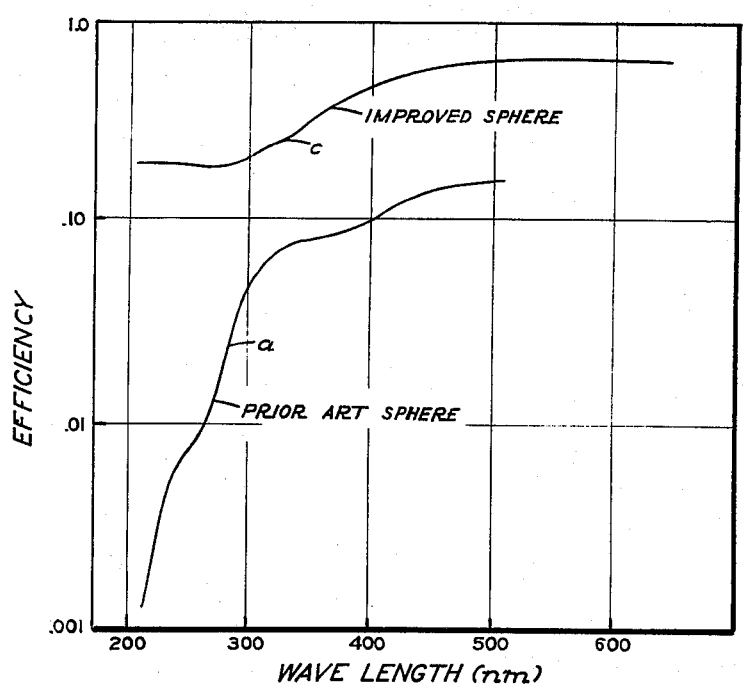
FIG. 3 is a graphical comparison of efficiency as a function of wavelength of a sphere according to the invention and the prior art sphere.

A sphere utilizing the teachings of the invention was built having an inside nominal diameter of 77 mm. and a radiation converting cuvette 15 which was 20 mm. in diameter by 5 mm. thick containing 2,5-diphenyloxazole (PPO, 0.923 g/l) in n-hexane. The efficiency of the improved averaging sphere was experimentally compared with the prior art sphere of FIG. 1 and the results are graphically represented in FIG. 3 which is a graph of efficiency as a function of wavelength over the range 200–600 nm. In FIG. 3 the ordinate is logarithmically scaled and curve $a$ represents the efficiency of the prior art sphere while curve $c$ represents the efficiency of the sphere utilizing the teachings of the invention. It is seen from FIG. 3 that at the longer visible wavelengths the improved sphere is about 4 times as efficient as the prior art sphere which represents the contribution to efficiency of the extended cavity walls. At the low ultraviolet wavelength of 200 nm the improved sphere is approximately 200 times as efficient as the prior art sphere which primarily represents the contribution of the radiation converting means. The efficiency of the improved device is roughly constant and is equal to 20 percent between 200 and 300 nm followed by a gradual increase to a constant level between 60 and 65 percent for wavelengths from 400 to beyond 650 nm. The averaging effectiveness of the new sphere indicated an insensitivity to beam displacements from the target center of $\pm\, 0.5$ mm. within a $\pm\, 10^{-4}$ limit of signal variation which is to be compared with a $\pm\, 5$ percent variation for the same photomultiplier used without the sphere.

While the invention has been disclosed in conjunction with an averaging device of spherical configuration it should be noted that it is not limited thereto and other convenient shapes such as cubic, cylindrical, tetrahedral and other shapes which may occur to one skilled in the art may be utilized.

Further, while we have described and illustrated a preferred embodiment of our invention, we wish it to be understood that we do not intend to be restricted solely thereto, but that we do intend to cover all modifications thereof which would be apparent to one skilled in the art and which come within the spirit and scope of our invention. We also wish to stress that the fluorescent dyes mentioned are not the only ones that can be used for the wavelength converter. Any photoluminescing compound which meets the requirements can be used, as well as any solvent which has the appropriate transmission properties and can dissolve the luminescing compound. Whereas the invention has been disclosed in regards to a liquid fluorophor contained in a cuvette it should be noted that suitable solid materials can be used also. For example, pressed luminescing powders, luminescing compounds embedded in glasses or plastics, as well as a target sprayed with an appropriate fluorescent paint can be used as the wavelength converter.

We claim:

1. A radiation flux averaging device having a relatively high efficiency over ultraviolet and visible wavelengths comprising:
    a hollow enclosure having an internal surface for which the diffuse reflectance over the ultraviolet portion of the spectrum is substantially less than the diffuse reflectance over the visible portion;
    said enclosure having a radiation entrance opening and a radiation exit opening;
    a target positioned within said enclosure facing said radiation entrance opening; and
    a fluorescent material disposed between said radiation entrance opening and said target for converting entering ultraviolet radiation to visible radiation, whereby entering ultraviolet and visible radiation is averaged by said device with high efficiency.

2. A radiation flux averaging device as set forth in claim 1, wherein said fluorescent material is a transparent liquid, and further comprising an ultraviolet-transmitting cuvette for containing said liquid.

3. A radiation flux averaging device as set forth in claim 2, wherein said cuvette has a front face facing said radiation entrance opening and a rear face parallel to said front face, said target comprising a diffusely reflecting coating on said rear face.

4. A radiation flux averaging device as set forth in claim 2, wherein said liquid comprises a solution of 2,5-diphenyloxazole in n-hexane.

5. A radiation flux averaging device as set forth in claim 1, wherein said target and said fluorescent material together comprise a diffusely reflecting coating disposed on said internal surface opposite said radiation entrance opening.

6. A radiation flux averaging device as set forth in claim 1, wherein said radiation exit opening comprises a tubular extension which is smoothly tapered into said enclosure.

* * * * *